United States Patent
Jones

(10) Patent No.: US 7,278,475 B2
(45) Date of Patent: Oct. 9, 2007

(54) CONTROL ARRANGEMENT FOR COOLING POWER ELECTRONIC COMPONENTS

(75) Inventor: Alan R. Jones, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/405,580

(22) Filed: Apr. 18, 2006

(65) Prior Publication Data

US 2006/0259156 A1 Nov. 16, 2006

Related U.S. Application Data

(63) Continuation of application No. PCT/GB2004/004125, filed on Sep. 28, 2004.

(30) Foreign Application Priority Data

Nov. 28, 2003 (GB) .................................. 0327641.7

(51) Int. Cl.
- F02C 7/12 (2006.01)
- G05D 23/00 (2006.01)
- F01P 5/10 (2006.01)
- F01P 7/00 (2006.01)
- F28F 13/00 (2006.01)
- F28F 25/00 (2006.01)

(52) U.S. Cl. .................. 165/205; 165/253; 165/287; 123/41.02; 123/41.44; 123/41.48; 60/39.83; 700/299

(58) Field of Classification Search .............. 165/200, 165/201, 205, 244, 253, 287; 700/11, 12, 700/19, 20, 299; 123/41.01, 41.31, 41.44, 123/41.48, 41.49, 41.02; 60/772, 39.83
See application file for complete search history.

(56) References Cited

U.S. PATENT DOCUMENTS

| | | | | |
|---|---|---|---|---|
| 3,818,983 A | 6/1974 | Grandia | | |
| 4,250,715 A * | 2/1981 | Ratliff | .......................... | 62/175 |
| 4,380,156 A * | 4/1983 | Ecker | ......................... | 62/235.1 |
| 4,450,396 A * | 5/1984 | Thornton | ..................... | 318/721 |
| 4,499,385 A * | 2/1985 | Slavik | ......................... | 307/10.1 |
| 4,601,202 A | 7/1986 | Colman | | |
| 5,558,069 A * | 9/1996 | Stay | ........................... | 123/541 |
| 5,701,750 A * | 12/1997 | Ray | ............................ | 62/160 |
| 6,116,040 A * | 9/2000 | Stark | .......................... | 62/259.2 |
| 6,401,670 B2 * | 6/2002 | Frunzetti et al. | .......... | 123/41.31 |
| 6,405,551 B1 * | 6/2002 | Kuwabara et al. | .......... | 62/238.7 |
| 6,578,362 B1 * | 6/2003 | Coffinberry | .................. | 60/782 |

(Continued)

FOREIGN PATENT DOCUMENTS

EP 1 113 233 A 7/2001

(Continued)

Primary Examiner—Crystal J. Barnes
(74) Attorney, Agent, or Firm—W. Warren Taltavull; Manelli Denison & Selter PLLC

(57) ABSTRACT

A control arrangement (10) comprises a first selectable controller (12) for controlling an action, and a second selectable controller (14) for controlling the action. The arrangement also includes a selector (22) for selecting one of the controllers (12, 14) to control the action. The arrangement (10) further includes a first heat exchanger (16) associated with the first controller (12) to effect a transfer of heat between the first controller (12) and the first heat exchanger (16). The arrangement also includes a second heat exchanger (18) associated with the second controller (14) to effect a transfer of heat between the second controller (14) and the second heat exchanger (18).

24 Claims, 3 Drawing Sheets

U.S. PATENT DOCUMENTS

| | | |
|---|---|---|
| 6,584,778 B1 * | 7/2003 | Griffiths et al. .............. 60/782 |
| 2005/0161193 A1 * | 7/2005 | McKenzie et al. ............ 165/73 |
| 2006/0032623 A1 * | 2/2006 | Tsubone et al. ............ 165/202 |
| 2006/0185626 A1 * | 8/2006 | Allen et al. .............. 123/41.12 |

FOREIGN PATENT DOCUMENTS

| | | | |
|---|---|---|---|
| EP | 1 154 135 A | | 11/2001 |
| JP | 2002089988 A | * | 3/2002 |
| JP | 2003232584 A | * | 8/2003 |

\* cited by examiner

CONTROL ARRANGEMENT FOR COOLING POWER ELECTRONIC COMPONENTS

This is a continuation of International Application Number PCT/GB2004/004125 filed Sep. 28, 2004, designating the United States.

FIELD OF THE INVENTION

This invention relates to control arrangements. More particularly, but not exclusively, the invention relates to control arrangements in which power electronic components are cooled, for example on engines such as gas turbine engines.

BACKGROUND OF THE INVENTION

Many components in gas turbine engines are required to be cooled in order to avoid overheating. In some cases, for example in the case of power electronic components, cooling is achieved by attaching the components to heat sinks.

In many applications in gas turbine engines, the heat sinks are supplied with a fluid, such as fuel or air, which acts as the low temperature reservoir to absorb the heat.

A problem with this arrangement is that in some conditions of use of the engine, the temperature difference between the fluid and the component to be cooled is not large enough to effect sufficient cooling of the component.

SUMMARY OF THE INVENTION

According to one aspect of this invention, there is provided a control arrangement comprising a first selectable controller for controlling an action, a second selectable controller for controlling the action, a selector for selecting one of the first and second controllers to control said action, wherein the arrangement further comprises a first heat exchanger associated with the first controller to effect a transfer of heat between the first controller and the first heat exchanger, and a second heat exchanger associated with the second controller means to effect a transfer of heat between the second controller and the second heat exchanger.

Desirably, the selector is provided to select one or the other of the first and second controllers to control said action depending upon the condition of the control arrangement. Preferably, the selector is provided to select the first controller to control said action in a first condition of the arrangement, and to select the second controller to control said action in a second condition of the arrangement.

Preferably, the first heat exchanger is arranged to effect said heat transfer when the first controller is selected. Preferably, the second heat exchanger is arranged to effect said heat transfer when the second controller is selected.

The first heat exchanger may be arranged to cool the first controller. The second heat exchanger may be arranged to cool the second controller.

The first controller may comprise electronic components, which may be power electronic components. Preferably, the electronic components of the first controller comprise at least one transistor and may also comprise at least one diode. Conveniently, the, or each, transistor of the first controller is an insulated gate bipolar transistor.

The second controller may comprise electronic components, which may be power electronic components. Preferably, the electronic components of the second controller comprise at least one transistor and may also comprise at least one diode. Conveniently, the, or each, transistor of the second controller is an insulated gate bipolar transistor.

The first and second controllers may be identical to each other.

Preferably, the first heat exchanger may comprise a fluid, preferably a flow of the fluid to effect said transfer of heat. The fluid may comprise fuel or air.

Preferably, the second heat exchanger comprises a second fluid, preferably a flow of the second-fluid to effect said heat transfer. Preferably, the second fluid comprises fuel or air.

In one embodiment, the first fluid associated with the first heat exchanger may be fuel, and the second fluid for the second heat exchanger may be air. Where the control arrangement is part of a gas turbine engine having a fan, the air may be a flow of air from the fan.

In one embodiment, the control arrangement may comprise a selectable third controller for controlling the action, which can be selected by the selector, and a third heat exchanger to effect transfer of heat between the third controller means and the third heat exchanger.

The third controller may comprise electronic components, which may be power electronic components. Preferably, the electronic components of the third controller comprise at least one transistor and may also comprise at least one diode. Conveniently, the, or each, transistor of the third controller is an insulated gate bipolar transistor.

The third heat exchanger may comprise a third fluid, preferably a flow of the third fluid to effect said transfer of heat. The third fluid may comprise fuel or air. The third heat exchanger means may be arranged to cool the third controller.

In one embodiment, where the control arrangement is part of an engine, the third fluid may be a flow of ambient air from a region external of the engine.

The third controller may be identical to the first and second controller. The third heat exchange means is preferably arranged to effect said heat transfer when the third controller is selected.

It will be appreciated that the control arrangement may comprise any desired number of selectable further controller and associated heat exchangers.

The further controller may comprise the features of the first and second controllers as described above, and the further heat exchanger may comprise features of the first and second heat exchanger as described above.

BRIEF DESCRIPTION OF THE DRAWINGS

An embodiment of the invention will now be described by way of example only, with reference to the accompanying drawings, in which.

DETAILED DESCRIPTION OF THE INVENTION

Figure 1:
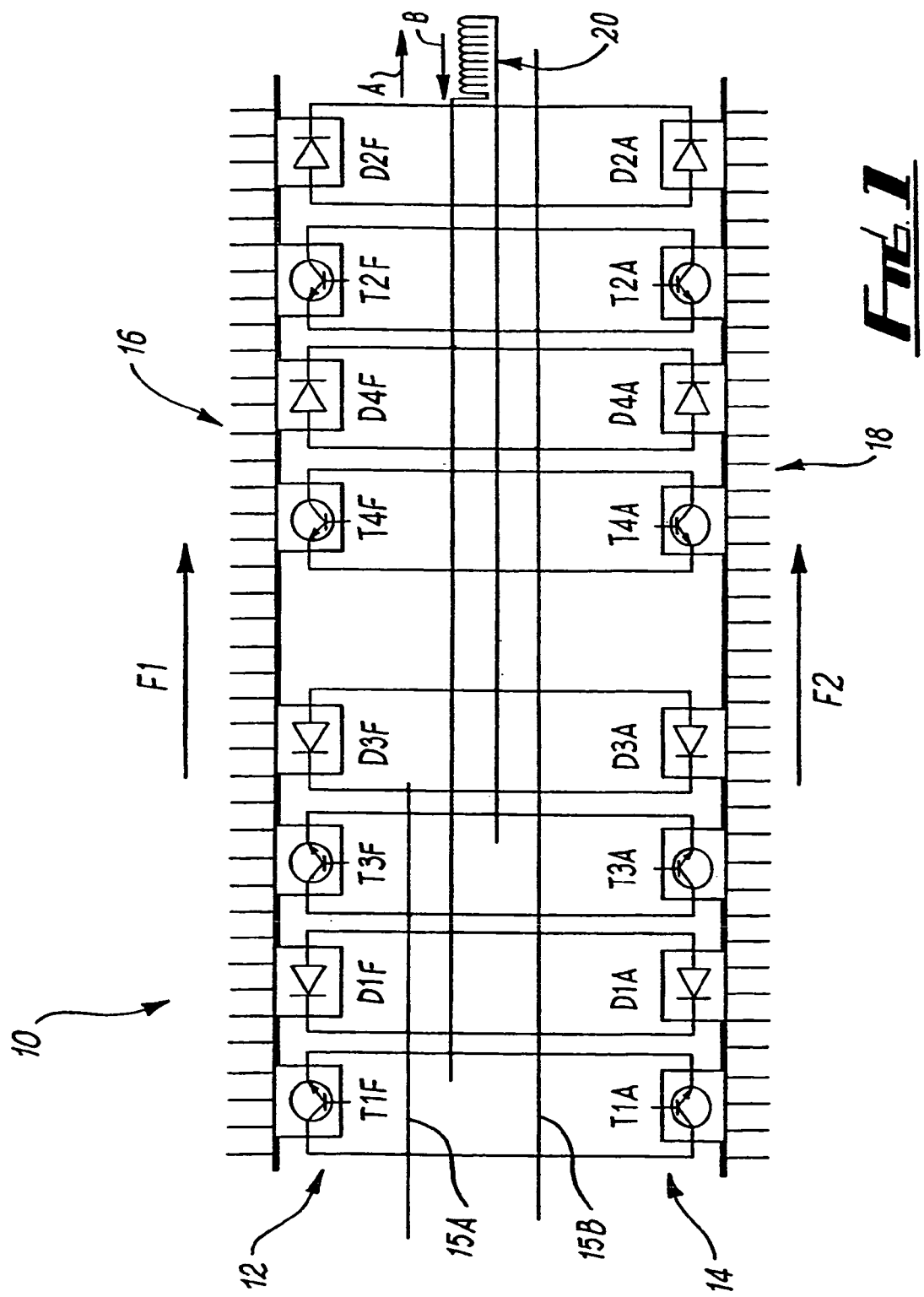
FIG. 1 shows schematically an embodiment of a control arrangement.
Figure 2:
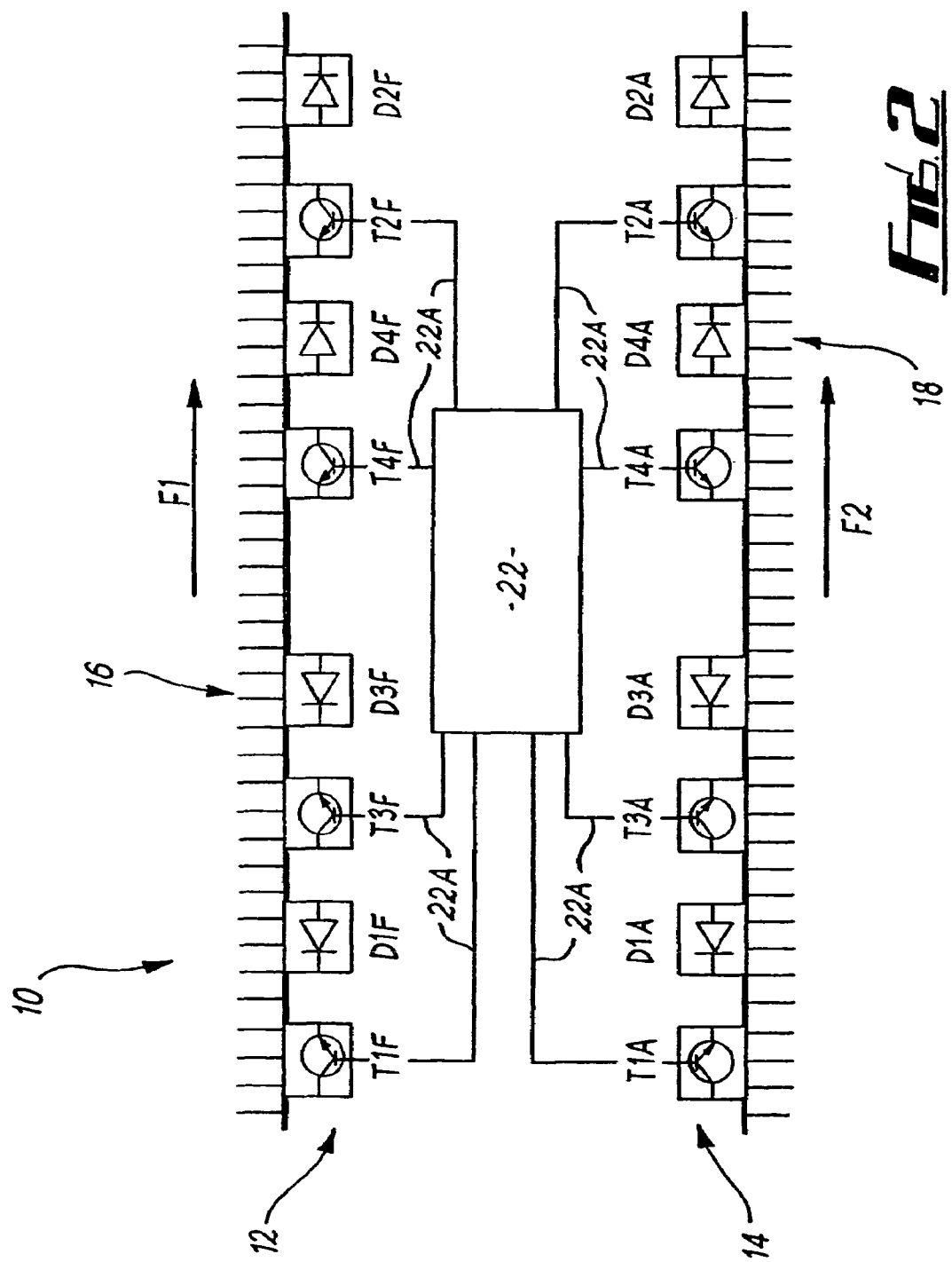
FIG. 2 shows a further schematic diagram of the embodiment shown in FIG. 1.
Figure 3:
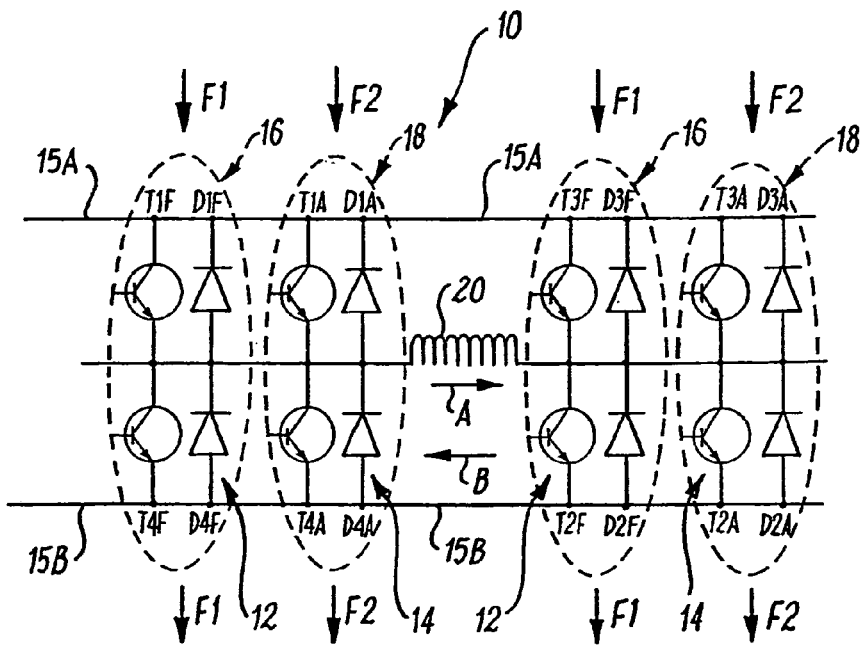
FIG. 3 is another schematic diagram of the embodiment shown in FIGS. 1 and 2.

Referring to the FIGS. 1 to 3, there is shown a control arrangement 10 comprising a first controller 12 for controlling an action, and a second controller 14 also for controlling the aforesaid action. A selector 22 is also provided for selecting either the first controller 12 or the second controller 14 to control the action. The selector 22 is omitted from FIGS. 1 and 3 for clarity but is shown in FIG. 2.

The control arrangement 10 further includes a first heat exchanger 16 associated with the first controller 12, and a second heat exchanger 18 associated with the second controller 14. The first and second heat exchangers 16, 18 are provided to cool the respective first and second controllers 12, 14. The first and second controllers 12, 14 are connected between a positive bus bar 15A and a negative bus bar 15B.

Each of the first and second controllers 12, 14 comprises a plurality of power electronic components in the form of transistors designated with the letter T, and diodes designated with the letter D. Both controllers 12, 14 are provided to direct the electrical power through a machine winding 20.

The first heat exchanger 16 is in the form of a heat sink supplied with a fluid, which, in the case of the embodiment shown is in the form of a flow of fuel F1 from an engine. The second heat exchanger 18 is supplied with a second fluid, and in the case of the second heat exchanger 18 in the embodiment shown, the fluid is in the form of a flow of air F2, which may be from a fan, or may be ambient air from outside the engine, dependent upon different conditions during the flight cycle of the engine.

The electronic components forming part of the first and second controllers 12, 14 may serve to control supply of power from the aircraft to the engine to start the engine and from the engine to the aircraft for operation of aircraft control surfaces and landing gear and/or may power a compressor providing compressed air for environmental control within the aircraft. Typically power electronic devices such as insulated gate bipolar transistors or other devices which are silicon based will be employed in this electronic circuitry which requires to be maintained below a predetermined temperature, generally around 125° C., for effective operation and long life.

During take off when the engine develops maximum thrust, the fan air will be at a relatively high temperature. This will inhibit the cooling of the second controllers 14. However, at take-off, the fuel flow rate is high and the fuel is therefore capable of absorbing substantial amounts of heat in the first heat exchanger 16. Accordingly under take-off conditions the selector 22 selects the first controller 12 to provide electrical power through the winding 20, and heat generated thereby is absorbed by the flow of fuel F1 through the first heat exchanger 16, and enables electronic devices to continue to lose heat to the flow of fuel F1 and thus remain below the operating temperature required for optimum operation.

At lower engine power conditions, for example when the aircraft is in descent, the fuel flow F1 reduces considerably and the heat removed by the first heat exchanger 16 is thus reduced. However under descent conditions the air from the engine fan is at a lower temperature than during take-off. The resultant temperature differential between the flow of fan air F2 through the second heat exchanger 18 and the second controller 14 when in operation would enable the second exchanger 18 to remove heat from the second controller 14. Thus, at such lower engine power conditions, the selector 22 selects the second controller 14 to control the flow of current through the winding 20, and the second controller 14 is cooled by the flow of air F2 through the second heat exchanger 18 enabling the electronic power devices to continue to reject heat to the flow of fan air F2.

Figure 4:
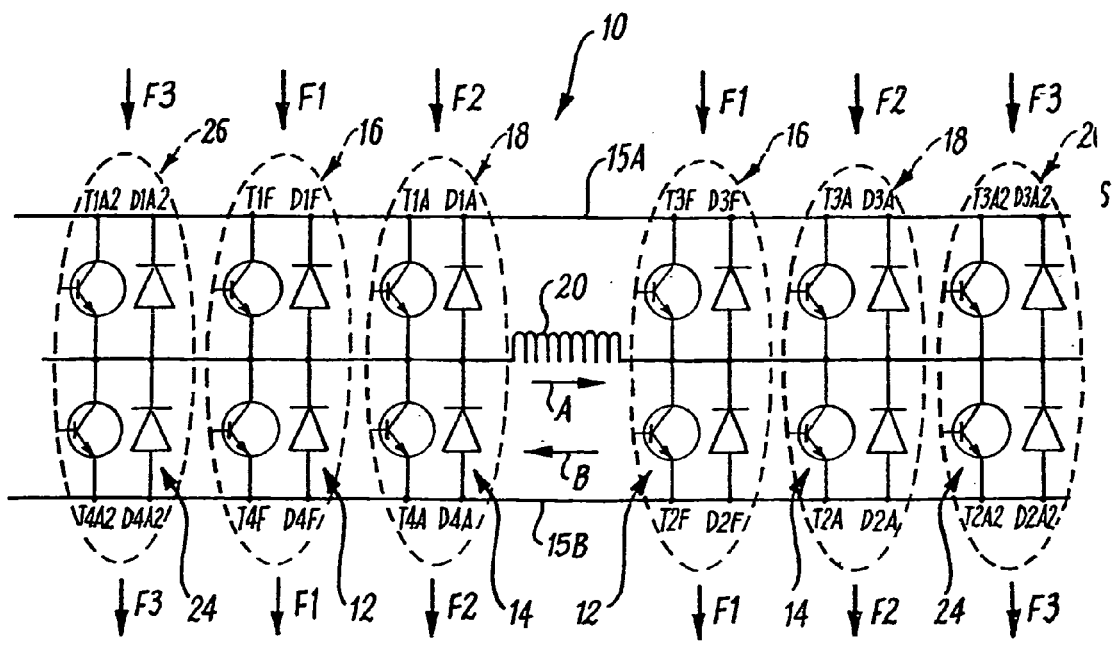
FIG. 4 is a schematic diagram of another embodiment

Thus, by virtue of the provision of the two controllers 12, 14 and two heat exchangers 16, 18, shown in FIGS. 1 to 3, the power electronic components are adequately cooled during different engine operating conditions. However under some conditions, for example during a transient engine manoeuvre such as deceleration from a high power condition, the flow of fuel F1 and the flow of fan air F2 will reduce and may become incapable of absorbing all the heat rejected from the electronic devices before the temperature of the fan air drops to a level which enables it to absorb the balance of the heat to be removed. In such cases, it may be necessary to incorporate a third controller 24, a third heat exchanger 26 and a third fluid F3 to remove heat from the third controller 24. The third controller 24 is connected between the positive bus bar 15A and the negative bus bar 15B. This arrangement of third controller 24, third heat exchanger 26, and third fluid F3 is similar to the arrangement of the first and second controllers 12, 14 the first and second heat exchangers 16 and 18 and the first and second fluids F1, F2, as shown in FIG. 4. The third fluid F3 is for example a flow of ambient air from around the engine.

A particular embodiment shown in the drawings will now be described more specifically. Referring to the FIGS. 1 to 3, the first controller 12 comprises a plurality of transistors and diodes, the transistors being labelled respectively T1F, T2F, T3F and T4F, and the diodes being labelled respectively D1F, D2F, D3F and D4F, the designation F representing that the components are cooled by the flow of fuel F1 in the first heat exchanger 16. The second controller 14 comprises an identical arrangement of transistors and diodes, with the transistors being labelled respectively T1A, T2A, T3A, T4A, and the diodes being labelled D1A, D2A, D3A, D4A, the designation A representing that the components are cooled by the flow of fan air F2.

Current can flow either from left to right through the winding 20, as shown by the arrow A or from right to left through the winding 20 as shown by the arrow B.

During a predetermined first condition of the engine, when it is desired that cooling can be effected by a flow of fuel F1, selection for example at take-off, of the selector 22 selects the first controller 12. In order to allow current to flow through the winding 20 in the direction indicated by the arrow A, the transistors T1F and T2F, are switched on. If transistors T1F and T2F are switched off, there will be a transient flow of current through diodes D3F, D3A, D4F and D4A. In order to allow current to flow in the direction of the arrow B, the transistors T3F and T4F are switched on. If the transistors T3F and T4F are switched off, there will be a transient flow of current through the diodes D1F, D1A, D2F and D2A.

During different conditions of the engine when it is desired that cooling can be effected by a flow of fan air for example during descent, the switching selector 22 selects the second controller 14. In order to allow current to flow through the winding 20 in the direction of the arrow A, the transistors T1A and T2A are switched on. If transistors T1A and T2A are switched off, there will be a transient flow of current through diodes D3F, D3A, D4F and D4A. In order for current to flow in the direction of the arrow B, transistors T3A and T4A are switched on. Switching off transistors T3A and T4A will cause a transient flow of current through the diodes D1F, D1A, D2F and D2A.

Referring to FIG. 2 the control arrangement 10 is again shown. However, in FIG. 2 the connections between the transistors, and the diodes have been omitted for clarity. Instead, the selector 22 is shown. The selector 22 is connected to each transistor T1A, T2A, T3A, T4A, T1F, T2F, T3F and T4F by suitable connections 22A. In order to switch on or select a desired one or more of the transistors, a predetermined respective current is transmitted along the appropriate connection 22A to the respective transistor to switch the transistor on or off.

The conditions under which the first controller 12 or the second controller 14 is selected will be based upon one or more of the following conditions, namely: the temperature measurements of the transistors; measured engine parameters such as flow rates and temperatures of fuel; engine parameters such as flow rates and temperatures of cooling air, calculated from other measured engine and ambient parameters by a computer model within the controller.

In some circumstances, the selector 22 may select both the first control means and the second control means. In such a situation, in order for current to flow in the direction of the arrow A through the winding 20, transistors T1F, T1A, T2F and T2A are switched on. In order for current to flow in the direction of the arrow B, transistors T3F, T3A, T4F and T4A are switched on.

FIG. 4 shows a further embodiment of the control arrangement 10, in which, as mentioned above a third controller 24 is provided. The embodiment shown in FIG. 4 includes al the features of the embodiment shown in FIGS. 1 to 3 and these features have been labelled with the same reference numerals.

The third controller 24 comprises a plurality of transistors and diodes, the transistors being labelled respectively T1A2, T2A2, T3A2 and T4A2, and the diodes being labelled respectively D1A2, D2A2, D3A2 and D4A2, the designation A2 representing that the components are cooled by a flow ambient air taken from around the engine.

The third controller 24 is selected when the flows of fuel F1 and fan air F2 are so low as to be incapable of absorbing heat from the electronic components. In order to allow a flow of current through the winding 20 in the direction of the arrow A, the transistor T1A2 and T2A2 are switched on. In order for current to flow in the direction of the arrow B the transistors T3A2 and T4A2 are switched on.

Various modifications can be made without departing from the scope of the invention, for example different fluids could be used as the cooling fluids in the heat exchangers. In addition, the electronic components may be different to those described above.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control arrangement comprising a first selectable controller for controlling an action, a second selectable controller for controlling the same action as the first selectable controller, a selector for selecting one of the first and second controller to control said action, wherein the arrangement further comprises a first heat exchanger associated with the first controller to effect a transfer of heat between the first controller and the first heat exchanger dependent upon a first flow, and a second heat exchanger associated with the second controller to effect a transfer of heat between the second controller and the second heat exchanger dependent upon a second flow, the selector being capable of determining the availability of the first flow and/or the second flow and accordingly select the first controller or the second controller to control the action.

2. A control arrangement according to claim 1 wherein the selector is provided to select one of the first and second controller to control said action depending upon the condition of the control arrangement.

3. A control arrangement according to claim 1 wherein the selector is provided to select the first controller to control said action in a first condition of the arrangement, and to select the second controller to control said action in a second condition of the arrangement.

4. A control arrangement according to claim 1 wherein the first heat exchanger is arranged to effect said heat transfer when the first controller is selected, and, the second heat exchanger is arranged to effect said heat transfer when the second controller is selected.

5. A control arrangement according to claim 1 wherein the first and second controllers comprise electronic components.

6. A control arrangement according to claim 5 wherein the electronic components comprise power electronic components.

7. A control arrangement according to claim 5 wherein the electronic components comprise at least one transistor and at least one diode.

8. A control arrangement according to claim 7 wherein the, or each, transistor is an insulated gate bipolar transistor.

9. A control arrangement according to claim 1 wherein the first and second controllers are substantially identical to each other.

10. A control arrangement comprising a first selectable controller for controlling an action, a second selectable controller for controlling the action, a selector for selecting one of the first and second controller to control said action, wherein the arrangement further comprises a first heat exchanger associated with the first controller to effect a transfer of heat between the first controller and the first heat exchanger dependent upon a first flow, and a second heat exchanger associated with the second controller to effect a transfer of heat between the second controller and the second heat exchanger wherein the first heat exchanger is arranged to cool the first controller, and the second heat exchanger is arranged to cool the second controller.

11. A gas turbine engine incorporating a control arrangement comprising a first selectable controller for controlling an action, a second selectable controller for controlling the same action as the first selectable controller, a selector for selecting one of the first and second controller to control said action, wherein the arrangement further comprises a first heat exchanger associated with the first controller to effect a transfer of heat between the first controller and the first heat exchanger dependent upon a first flow, and a second heat exchanger associated with the second controller to effect a transfer of heat between the second controller and the second heat exchanger.

12. A control arrangement comprising a first selectable controller for controlling an action, a second selectable controller for controlling the action, a selector for selecting one of the first and second controller to control said action, wherein the arrangement further comprises a first heat exchanger associated with the first controller to effect a transfer of heat between the first controller and the first heat exchanger dependent upon a first flow, and a second heat exchanger associated with the second controller to effect a transfer of heat between the second controller and the second heat exchanger wherein the first heat exchanger comprises a first fluid to effect said transfer of heat, and the second heat exchanger comprises a second fluid, to effect said heat transfer wherein the first and second fluids comprise fuel or air.

13. A control arrangement according to claim 12 wherein the first fluid associated with the first heat exchanger comprises fuel, and the second fluid associated with the second heat exchanger comprises air.

14. A control arrangement according to claim 12 wherein the control arrangement is part of a gas turbine engine having a fan, the air comprises a flow of air from the fan.

15. A control arrangement comprising a first selectable controller for controlling an action, a second selectable controller for controlling the same action as the first selectable controller, a selector for selecting one of the first and second controller to control said action, wherein the arrangement further comprises a first heat exchanger associated with the first controller to effect a transfer of heat between the first controller and the first heat exchanger dependent upon a first flow, and a second heat exchanger associated with the second controller to effect a transfer of heat between the second controller and the second heat exchanger wherein the arrangement further comprises a selectable third controller for controlling the action, which can be selected by the selector, and a third heat exchanger to effect transfer of heat between the third controller and the third heat exchanger.

16. A control arrangement according to claim 15 wherein the third controller comprises electronic components.

17. A control arrangement according to claim 16 wherein the electronic components comprise power electronic components.

18. A control arrangement according to claim 16 wherein the electronic components comprise at least one transistor and at least one diode.

19. A control arrangement according to claim 18 wherein the, or each, transistor is an insulated gate bipolar transistor.

20. A control arrangement according to claim 15 wherein the third heat exchanger is arranged to cool the third controller.

21. A control arrangement according to claim 15 wherein the third heat exchanger comprises a third fluid to effect said transfer of heat.

22. A control arrangement according to claim 21 wherein the third fluid comprises fuel or air.

23. A control arrangement according to claim 22 wherein the control arrangement is part of an engine, the third fluid comprising a flow of ambient air from a region external of the engine.

24. A control arrangement according to claim 15 wherein the third controller is substantially identical to the first and second controllers, the third heat exchanger being arranged to effect said heat transfer when the third controller is selected by the selector.

* * * * *